(12) United States Patent
Simpson et al.

(10) Patent No.: US 6,894,795 B1
(45) Date of Patent: *May 17, 2005

(54) METHOD AND APPARATUS FOR ENHANCING THE PERCEPTUAL PERFORMANCE OF A POST-PRINTING APPLICATION ENVIRONMENT

(75) Inventors: Shell S. Simpson, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/430,406

(22) Filed: Oct. 29, 1999

(51) Int. Cl.$^7$ ............................................. G06K 15/00
(52) U.S. Cl. ..................................... 358/1.15; 358/1.13
(58) Field of Search .................................. 358/1.1, 1.14, 358/404, 1.15, 1.11, 1.16, 1.12, 524, 537; 399/9, 1, 8, 11, 81–85, 87

(56) References Cited

U.S. PATENT DOCUMENTS

| 5,036,361 A | * | 7/1991 | Filion et al. | .................. 399/81 |
| 5,293,463 A | * | 3/1994 | Masuda | ....................... 358/1.1 |

* cited by examiner

*Primary Examiner*—Arthur G. Evans

(57) ABSTRACT

A method of apprising a user of print job status includes assessing what portion of a print job has been processed, displaying a status of the print job reflecting the portion of the print job that has been processed, iterating assessing and displaying until assessing determines that the print job has been entirely processed and terminating the print job when assessing determines that the print job has been entirely processed.

21 Claims, 4 Drawing Sheets

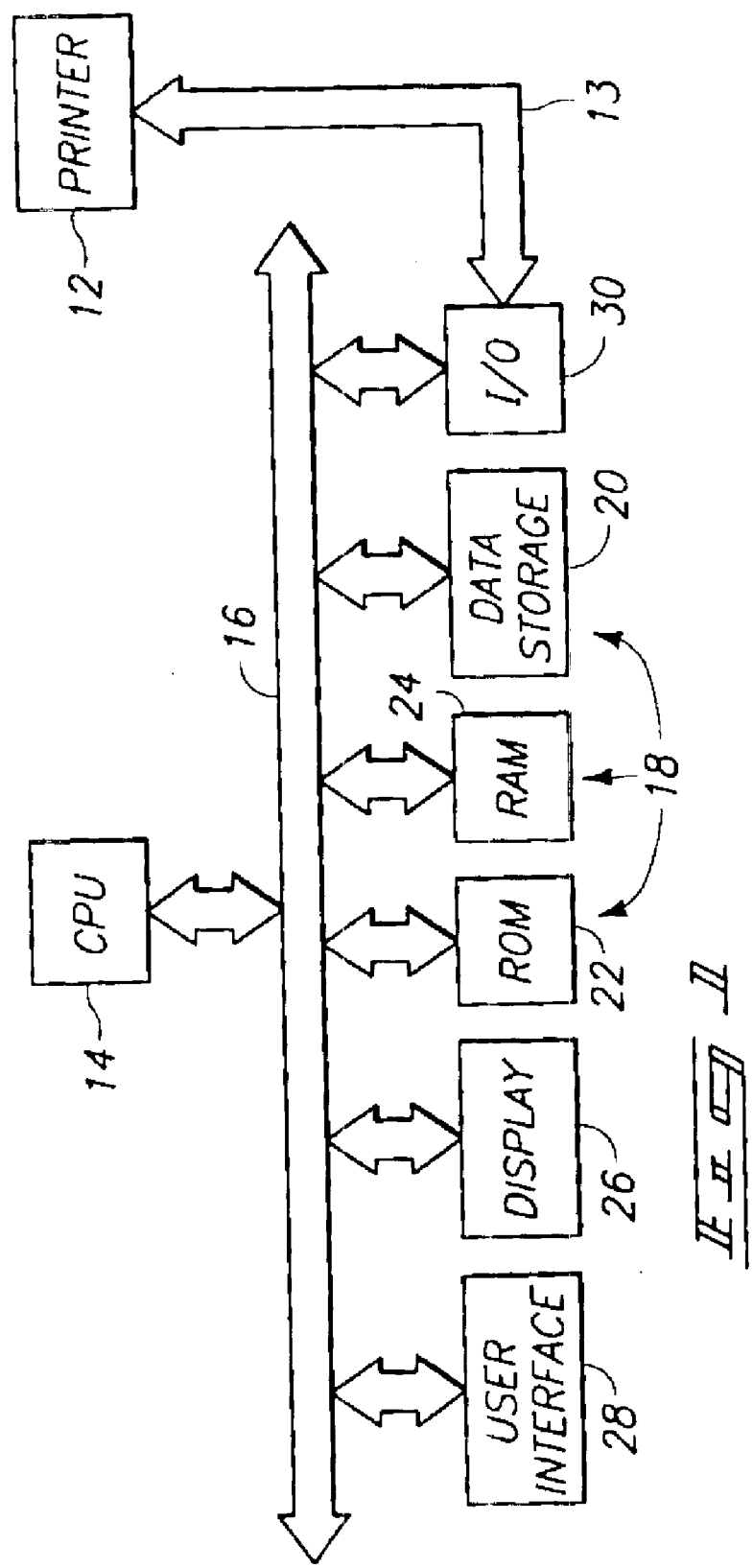

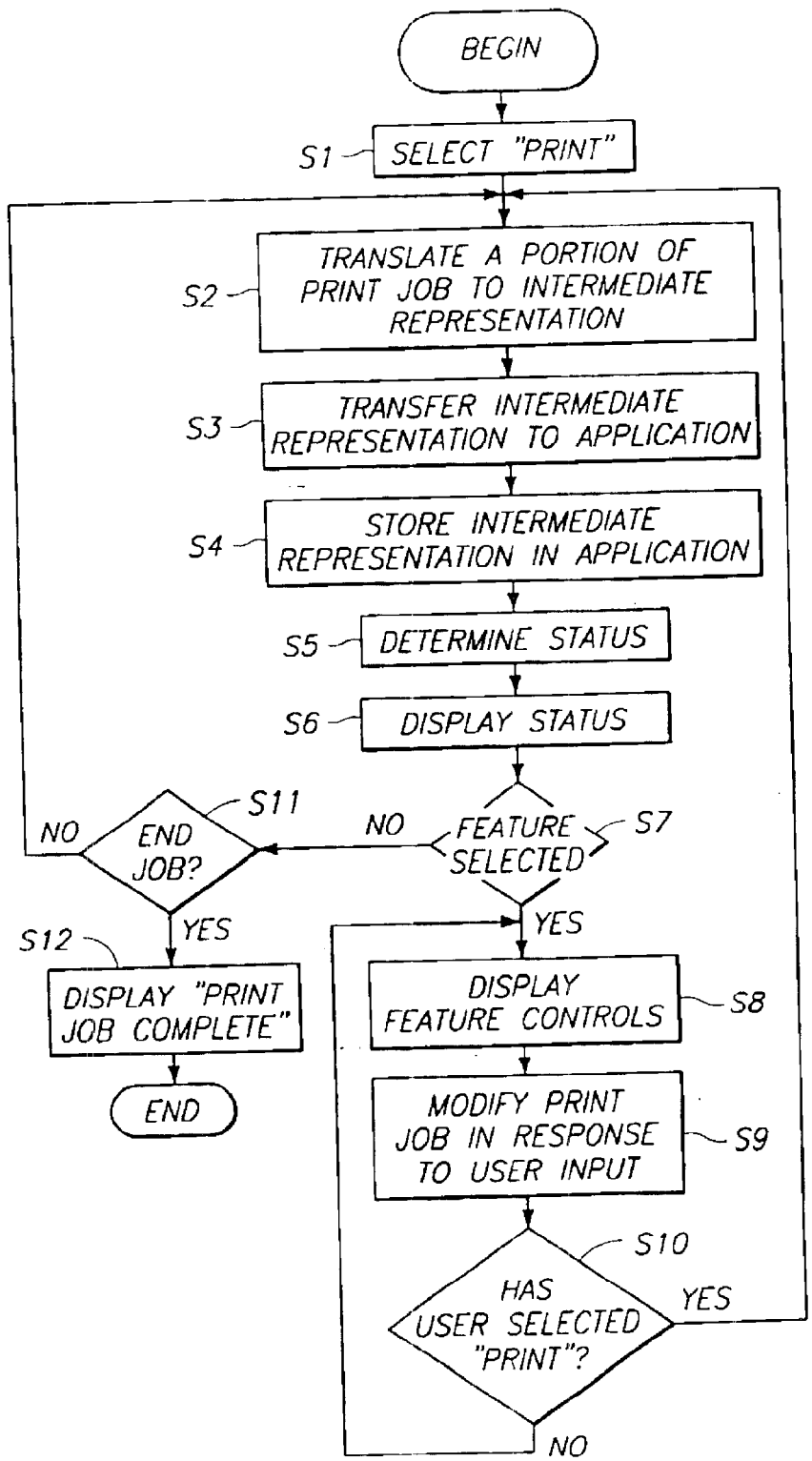

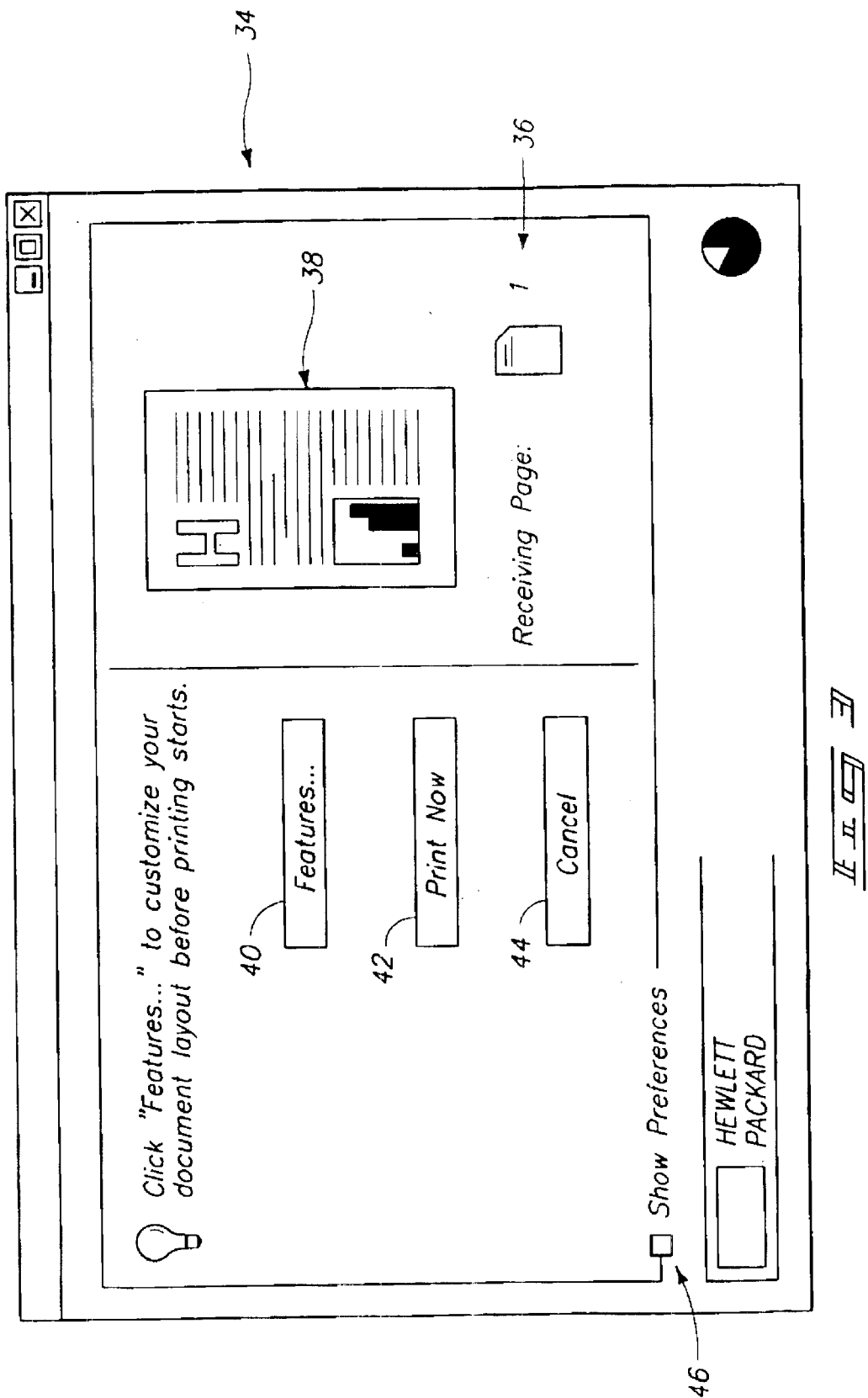

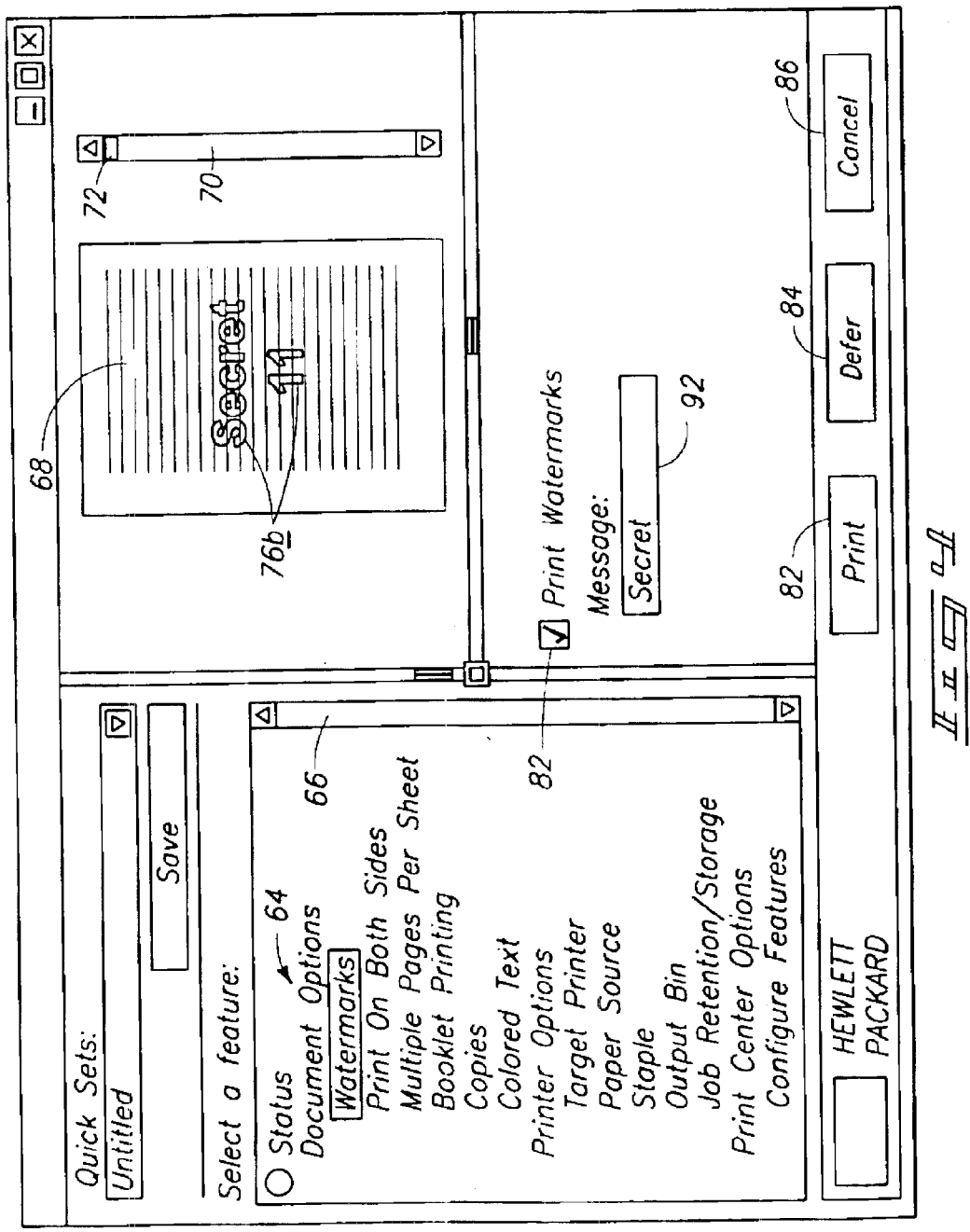

METHOD AND APPARATUS FOR ENHANCING THE PERCEPTUAL PERFORMANCE OF A POST-PRINTING APPLICATION ENVIRONMENT

FIELD OF THE INVENTION

The invention relates to printers and computer networks. More particularly, the invention relates to selection of print features.

BACKGROUND OF THE INVENTION

Over the last several decades, computer systems have become increasingly complex, and, at the same time, have been modified to provide increasing numbers of options, capabilities and customization features for specific tasks. Printer technology is a dramatic example of the increased capabilities that even modest modern computer systems offer compared to those of a few decades ago. Widespread adoption of features allowing on-the-fly modification of print parameters (e.g., font, print size, mixed graphic/text output, selection of multiple printers, paper sources etc.) permit very complex printer operations to be carried out with relative ease, compared to what is possible with older print technologies, such as those using daisy-wheel printing systems.

The increased capabilities found within modern printer systems requires increased sophistication in the commands that are sent to the printer in order to carry out the user's desired print options. In turn, the user has a larger number of options to select in composing a document to be printed. As a result, the need to be able to organize and to display printer options in a compact, organized and user-friendly fashion has grown dramatically.

In some printing applications, the entire print job must be processed before the user is provided with information relating to the status of the print job. This is generally not problematic for short print jobs but may provide some user annoyance when the print job is long.

SUMMARY OF THE INVENTION

In accordance with an aspect of the present invention, a method of apprising a user of print job status includes assessing what portion of a print job has been processed, displaying a status of the print job reflecting the portion of the print job that has been processed, iterating assessing and displaying until assessing determines that the print job has been entirely processed and terminating the print job when assessing determines that the print job has been entirely processed.

In accordance with another aspect of the present invention, an article of manufacture includes a computer usable medium having computer readable code embodied therein to cause a display to depict a graphical user interface configured to allow user selection and modification of print engine options for printing a document. The computer readable program code in the article of manufacture is configured to assess what portion of a print job has been processed, display a status of the print job reflecting the portion of the print job that has been processed, iterate assessment and display until assessment determines that the print job has been entirely processed and terminate the print job when assessment determines that the print job has been entirely processed.

In accordance with yet another aspect of the present invention, a computer implemented printer control system includes memory operative to store files representing at least one document to be printed, a print engine responsive to commands and configured to print a document corresponding to a selected one of the files and a display driver configured to provide an image of a graphical user interface in a viewing window. The graphical user interface is configured to allow user selection and modification of print engine options in a printer application for printing the document. The printer control system also includes processing circuitry configured to assess what portion of a print job has been processed in the printer application, display a status of the print job reflecting the portion of the print job that has been processed, iterate assessment and display until assessment determines that the print job has been entirely processed and terminate the print job when assessment determines that the print job has been entirely processed.

Other features and advantages of the invention will become apparent to those of ordinary skill in the art upon review of the following detailed description, claims, and drawings.

DESCRIPTION OF THE DRAWINGS

FIG. 1 is a simplified block diagram of a computer system and printer, in accordance with an embodiment of the present invention.

FIG. 2 is a simplified flowchart illustrating a process, in accordance with an embodiment of the present invention.

FIG. 3 is a simplified view of a graphical user interface for controlling the printer of FIG. 1 using the process shown in the flow chart of FIG. 2, in accordance with an embodiment of the present invention.

FIG. 4 is a simplified view of an exemplary graphical user interface for controlling the printer of FIG. 1 using the process shown in the flow chart of FIG. 2, in accordance with an embodiment of the present invention.

DETAILED DESCRIPTION OF THE INVENTION

FIG. 1 is a simplified block diagram of a computer system 10 and printer 12 coupled together via a bus 13, in accordance with an embodiment of the present invention. The computer system 10 includes a central processing unit (CPU) 14 that is coupled to a data and address bus 16. The data and address bus 16 is coupled to a memory system 18. The memory system 18 includes nonvolatile mass data storage device 20, which may include a CD ROM, floppy drive, hard drive, zip drive, floptical storage, optical storage, tape storage or other forms of data storage and retrieval devices known in the art. The memory system 18 also includes a read only memory (ROM) 22 and a random access memory (RAM) 24. In one embodiment, the computer system includes the memory system 18 or other computer readable medium bearing software that will be described below. A display 26 and a user interface 28 are also coupled to the CPU 14 through the data and address bus 16. The computer system 10 includes I/O devices 30 coupled to the data and address bus 16 to promote data communications between the computer system 10 and external data processing and conditioning devices, including the printer 12. It will be appreciated that more complex computer systems are also used in conjunction with printers 12, however, for clarity of explanation and ease of understanding, the present invention will be described in the context of the computer system 10 of FIG. 1.

In one embodiment, the user interface 28 includes a keyboard and a cursor manipulating tactile input device, such as a mouse or a touchpad. However, it is understood that other forms of input devices can also be used including voice recognition systems, joysticks, graphics tablets, data readers, card readers, magnetic and optical readers, other computer systems etc. The user receives visual feedback via the display 26. According to one construction, the display 26 comprises a graphics display terminal, such as a CRT display or a liquid crystal display. The user enters commands and text via the user interface 28 and observes feedback from the computer system 10 using the display 26. The CPU 14 operates on data using modules composed of lines of code that typically are stored in RAM 24, in response to the commands from the user, and provides results that may be stored in the memory system 18, displayed on the display 26 or that may be communicated to other devices external to the computer system 10, such as the printer 12. The modules may or may not be defined by a subroutine separate from a main program. It will be understood that while the invention is described in terms of a computer system 10 and a printer 12, it may also be practiced in systems that include multiple computers, such as servers and the like.

FIG. 2 is a simplified flowchart illustrating a process P1 in accordance with one aspect of the invention. The process P1 begins with a step S1. In the step S1, the user initiates a print job to print a document represented in the memory system 18 of FIG. 1. In a step S2, a portion of the print job is translated to an intermediate representation. In a step S3, the intermediate representation of the portion of the print job is transferred to a printer application. In a step S4, the printer application stores the intermediate representation of the portion of the print job. In a step S5, the process P1 determines the status of the print job. In a step S6, the process P1 displays the status in a graphical user interface (shown in FIG. 3). In a query task S7, the process P1 determines if the user has opted to examine and/or modify print features. When the process P1 determines that the user has opted to examine or modify the print features, control passes to a step S8. In the step S8, the process P1 displays a feature dialog box together with controls for the feature. An exemplary feature dialog box is shown in FIG. 4. In a step S9, the process P1 modifies the print job in response to user input. Control then passes to a query task S10. In the query task S10, the process P1 determines if the user has opted to return to printing the job. When the query task S10 determines that the user has opted to return to printing, control passes to the step S2, and the printing job continues to execute. When the query task S10 determines that till the user has not opted to continue printing, control returns to the step S8.

When the step S7 determines that the user has not opted to review or modify the print features, control passes to a query task S11. In the query task S11, the process P1 determines if the print job has ended. When the query task S11 determines that the print job has not ended, control passes to the step S2. When the query task S11 determines that the print job has ended, control passes to a step S12. In the step S12, the process P1 displays a "print job complete" message. The process P1 then ends.

FIG. 3 is a simplified view of a graphical user interface for controlling the printer 12 of FIG. 1 using the process P1 shown in the flow chart of FIG. 2, in accordance with an embodiment of the present invention. FIG. 3 shows a graphical user interface 34 including a status portion 36, a print preview image 38 corresponding to the page indicated in the status portion 36, user-selectable buttons 40, 42 and 44, labeled "Features," "Print Now" and "Cancel," respectively, and a user-selectable feature 46 labeled "Show Preferences." The status portion 36 is updated in the steps S5 and S6 of the process P1 of FIG. 2. In one embodiment, the graphical user interface 34 is displayed for an interval that is long enough to allow the user to modify the print features. In one embodiment, the user may pre-select the duration of the interval for displaying the graphical user interface using the "Show Preferences" feature 46.

When the user decides to modify features of the print job, the user may select the "Features" button 40 to transfer from the graphical user interface 34 of FIG. 3 to a feature selection dialog box, shown in FIG. 4. The user may opt to have the print job begin immediately by selecting the "Print" button 42, or may opt to cancel the print job by selecting the "Cancel" button 44. When the user opts to modify features of the print job by selecting the "Features" button 40, a display such as the feature selection dialog box of FIG. 4 results, temporarily suspending processing of the print job and allowing the user to select features for modification and also allowing the user to modify the selected features.

FIG. 4 shows a simplified view of an exemplary graphical user interface for controlling the printer 12 of FIG. 1 using the process P1 shown in the flow chart of FIG. 2, in accordance with an embodiment of the present invention. The exemplary graphical user interface of FIG. 4 includes a list of features 64, a scroll bar 66 for displaying additional entries in the list 64, a print preview image 68 corresponding to a user-selectable page of the document to be printed, a scroll bar 70 and a button 72 for selecting the page for the print preview image 68.

In the example of FIG. 4, the user has selected the "Watermarks" feature from the list of features 64 using the scroll bar 66 in the step S7 of FIG. 2. The user has selected page 11 for the print preview image 68 using the scroll bar 70/button 72. The print preview image 68 includes a watermark 76b displaying the legend "Secret" as it will appear on page 11 when it is printed.

The exemplary display of FIG. 4 also includes user-selectable buttons 82, 84 and 86, labeled "Print," "Defer" and "Cancel," respectively. The user has set the "Watermarks" feature to "Secret" using a user-editable text box 92 in the step S9. When the user selects the "Print" button 82, the print job is reCase started and control passes back to the step S2. The user may also opt to defer or cancel the print job using the buttons 84 or 86, respectively.

By providing the graphical user interface shown in FIG. 3 and thereby apprising the user of the status of the print job, the user's perception of progress of the print job is improved, compared to systems where the user is not provided with feedback about print job status until the entire print job has been processed.

The protection sought is not to be limited to the disclosed embodiments, which are given by way of example only, but instead is to be limited only by the scope of the appended claims.

What is claimed is:

1. A method of apprising a user of print job status comprising assessing what portion of a print job has been processed, displaying a status of the print job reflecting the portion of the print job that has been processed, wherein the displaying the status includes displaying a user-selectable feature control, determining when the user has selected the user-selectable feature control, and then displaying a list of user-selectable features instead of displaying the status to customize the print job, iterating assessing and displaying until assessing determines that the print job has been entirely processed and terminating the print job wheri assessing determines that the print job has been entirely processed.

2. The method of claim 1, further comprising, translating a portion of a print job to an intermediate representation in a printer driver, transferring the intermediate portion to the printer application and storing the intermediate portion of the print job in the printer application.

3. The method of claim 1, further comprising displaying a print job complete message when assessing determines that the print job has been entirely processed.

4. The method of claim 1, further comprising interrupting the print job when the user has selected the user-selectable feature control.

5. The method of claim 4, further comprising re-starting the print job when the user provides a print command.

6. An article of manufacture comprising a computer usable medium having computer readable code embodied therein to cause a display to depict a graphical user interface configured to allow user selection and modification of print engine options for printing a document, the computer readable program code in the article of manufacture being configured to assess what portion of a print job has been processed, display a status of the print job reflecting the portion of the print job that has been processed, wherein displaying the status includes displaying a user-selectable feature control, determining when the user has selected the user-selectable feature control, and then displaying a list of user-selectable features instead of displaying the status to customize the print job, iterate assessment and display until assessment determines that the print job has been entirely processed and terminate the print job when assessment determines that the print job has been entirely processed.

7. The article of manufacture of claim 6, the computer readable program code in the article of manufacture being configured to translate a portion of a print job to an intermediate representation in a printer driver, transfer the intermediate portion to the printer application and store the intermediate portion of the print job in the printer application.

8. The article of manufacture of claim 6, the computer readable program code in the article of manufacture being configured to display a print job complete message when assessment determines that the print job has been entirely processed.

9. The article of manufacture of claim 6, the computer readable program code in the article of manufacture being configured to interrupt the print job when the user has selected the user-selectable feature control.

10. The article of manufacture of claim 9, the computer readable program code in the article of manufacture being configured to re-start the print job when the user provides a print command.

11. A computer implemented printer control system comprising:
   memory operative to store files representing at least one document to be printed;
   a display driver configured to provide an image of a graphical user interface in a viewing window, the graphical user interface configured to allow user selection and modification of print engine options in a printer application for printing the document; and
   processing circuitry configured to assess what portion of a print job has been processed in the printer application, display a status of the print job reflecting the portion of the print job that has been processed, iterate assessment and display until assessment determines that the print job has been entirely processed and terminate the print job when assessment determines that the print job has been entirely processed.

12. The printer control system of claim 11, wherein the processing circuitry comprises a processor configured to translate a portion of a print job to an intermediate representation in a printer driver, transfer the intermediate portion to the printer application and store the intermediate portion of the print job in the printer application.

13. The printer control system of claim 11, wherein the processing circuitry comprises a processor configured to display a user-selectable feature control together with the status.

14. The printer control system of claim 11, wherein the processing circuitry comprises a processor configured to display a user-selectable feature control together with the status, determine when the user has selected the user-selectable feature control and then display a list of user-selectable features instead of the status.

15. The printer control system of claim 14, wherein the processing circuitry comprises a processor configured to interrupt the print job when the user has selected the user-selectable feature control.

16. The printer control system of claim 15, wherein the processing circuitry comprises a processor configured to re-start the print job when the user provides a print command.

17. A method of apprising a user of print job status, comprising:
   assessing what portion of a print job has been processed;
   displaying a status of the print job reflecting the portion of the print job that has been processed together with a control interface to enable a user to interrupt the print job;
   interrupting the print job upon receiving a user request;
   displaying a list of user-selectable features for modifying the print job instead of displaying the status of the print job after interruption of the print job;
   enabling the user to modify one or more features of the print job in order to customize the print job; and
   re-starting the print job upon receiving a print request from the user 14 after the enabling.

18. The method of claim 17, further comprising:
   iterating assessing and displaying until assessing determines that the print job has been entirely processed; and
   terminating the print job when assessing determines that the print job has been entirely processed.

19. The method of claim 17, wherein interruption of the print job occurs upon selection of the control interface to modify the print job.

20. The method of claim 17, wherein the disabling comprises restarting the print job.

21. The method of claim 17, wherein displaying the control interface comprises displaying the control interface for a predetermined time interval.

* * * * *